United States Patent [19]

Fletcher et al.

[11] 4,039,925
[45] Aug. 2, 1977

[54] PHASE SUBSTITUTION OF SPARE CONVERTER FOR A FAILED ONE OF PARALLEL PHASE STAGGERED CONVERTERS

[76] Inventors: James C. Fletcher, Administrator of the National Aeronautics and Space Administration, with respect to an invention of W. T. McLyman, Lakewood; Gene W. Wester, Pasadena, both of Calif.

[21] Appl. No.: 694,855

[22] Filed: June 10, 1976

[51] Int. Cl.² ............................................. H02M 7/00
[52] U.S. Cl. ....................................... 363/70; 307/64; 363/53
[58] Field of Search ............................. 307/64, 65, 66; 321/27 R, 11, 27 MS

[56] References Cited
U.S. PATENT DOCUMENTS 3,703,644  11/1972  Thorborg .............................. 307/64
3,823,362  7/1974  Bailey ............................. 321/27 MS Primary Examiner—William M. Shoop
Attorney, Agent, or Firm—Monte F. Mott; Paul F. McCaul; John R. Manning

[57] ABSTRACT

Failure detection and substitution of a spare module is provided in a system having a plurality of phase staggered modules connected in parallel to deliver regulated voltage from an unregulated source. Phase control signals applied to the active converter modules are applied to the spare module through NOR gates associated with and disabled by the power output of respective active modules such that failure of any one enables its phase control signal to be applied to the spare module, thus controlling the spare module to operate in the phase position of the failed module. A NAND gate detects when any one active module fails and enables a gate in the spare module, thus activating the spare module.

11 Claims, 6 Drawing Figures

FIG. 1

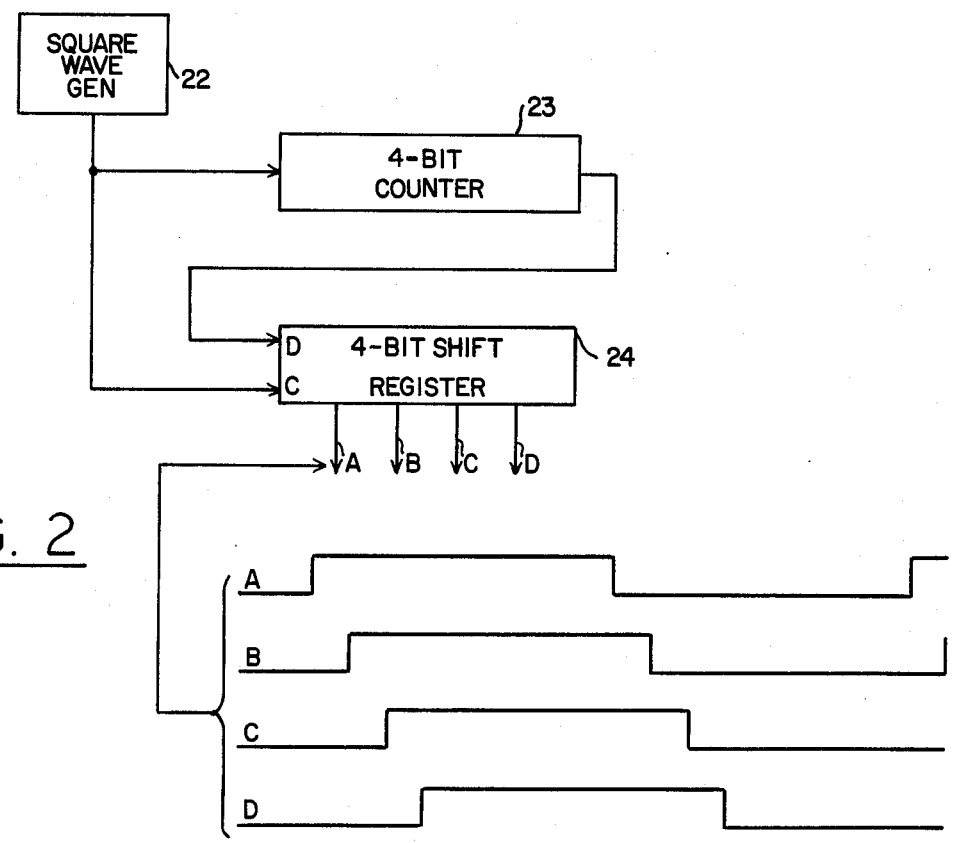
FIG. 2
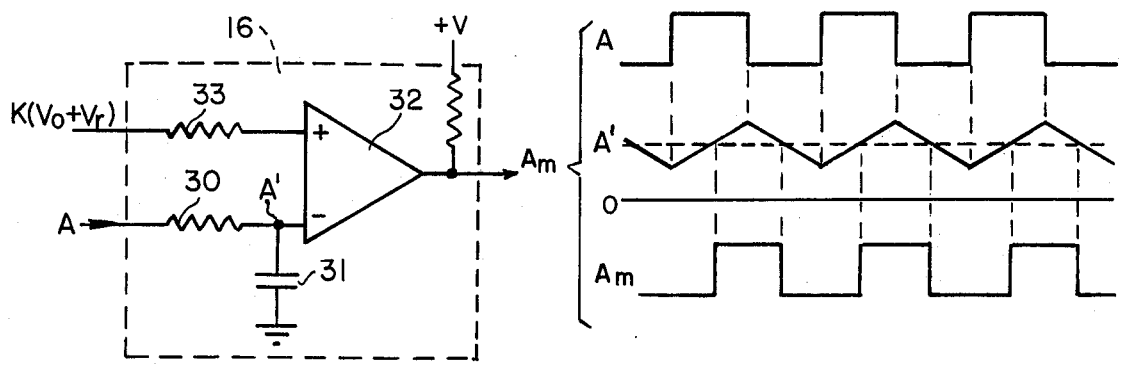
FIG. 3
FIG. 4

FAILURE DETECTOR & MODULE SUBSTITUTER —14—

PHASE SUBSTITUTION OF SPARE CONVERTER FOR A FAILED ONE OF PARALLEL PHASE STAGGERED CONVERTERS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to phase-staggered power converters connected in parallel to a load, and more particularly to apparatus for sensing the failure of an active converter module and automatically substituting a standby converter module in proper phase sequence.

Electrical power systems used in satellites, and other long-life electrical apparatus of a similar nature employ converters for conditioning the output of a DC power source. For satellites the power source is typically comprised of solar cell arrays, but for other applications, such as deep ocean buoys, the power source may be battery cells.

Reliability of operation throughout the expected life of the apparatus, such as the life of a mission of a satellite, is essential. This can be provided insofar as the power supply is concerned by utilizing small converter modules operating in parallel. An attractive feature of this approach is that new systems can be tailored to new requirements by simply changing the number of modules without any need for developing new circuits.

However, because of the high voltage input of typically 400 volts, design of an input filter is a challenge since conventionally used filter capacitors are of the tantalum electrolytic type which are not reliable at such high voltages. The type of capacitor best suited for such applications is the metallized polycarbonate dielectric type, but such capacitors are available only in very slow capacitance valves. By using a staggered phase approach, it is possible to increase the equivalent input current ripple frequency by a factor of four while simultaneously decreasing the ripple amplitude of the current required from the input filter for the power stages. This makes it possible to use much smaller capacitors in the input filter.

For the necessary reliability, one approach has been the provision of simple redundancy. A spare converter module is included with provision to switch to the spare in the event one of the converters on the line fails. The concept of substituting a standby power unit for one that has failed has been applied in many different arrangements representative of which are systems disclosed in the following U.S. Pat. Nos.: 2,546,410; 2,694,155; 3,193,705; 3,505,531 and 3,811,050. However, the power units in these systems are independent and do not involve phase-staggered units connected in parallel to a load such that substitution of a standby unit presents no real problem once the failure of a unit is detected. In the earliest U.S. Pat. No. 2,546,410, the system disclosed is for substituting a spare turbo-generator for a failed turbo-generator. There the independent units deliver power to buses at different frequencies so that it is necessary to adjust the frequency of the spare to the frequency of the unit for which the spare is being substituted. However, that is a distinct problem from substituting a spare in a multiphased system of modules delivering power to a common load.

The advantages of phase-staggered converter modules go beyond increasing reliability and the ability to use much smaller capacitors in the input filter. When a power converter fails in a system which does not phase-stagger the converters, there is an interruption of power while the spare is being switched. This interruption, even if only of short duration, creates surges and transients which adversely affect operation of the load. This is of significance to space missions where the power demands continue to increase with each successive mission. Also, space missions of longer duration have increased the need for greater reliability. Interruption of power during the switching period is significantly reduced by operating the converter modules supplying power to a common load in a multiphase or staggered sequence. However, since failure is unpredictable, i.e., random, substitution of the standby converter in proper phase presents a problem. If not substituted in proper phase, so that the multi-phase arrangement is not disturbed, the aforementioned advantages of the system are lost in that surges and transients are created that may adversely affect operation of the various electronic equipments of the space mission, and which may require larger filter capacitors.

SUMMARY OF THE INVENTION

In accordance with the present invention, failure detection and substitution of a spare converter module is provided in a system having a plurality of phase-staggered converter modules connected in parallel to deliver power to a load. Staggered-phase control signals derived from a clock pulse source are applied to the converter modules to operate them in staggered phase. The power output of each active module is sensed to produce a signal indicative of the module operating.

The individual phase control signals are coupled to a spare module by separate gating means disabled by the respective operating indication signals. Failure of any one converter module thus enables the phase control signal of that module to be applied to the spare module. In accordance with a further feature of the invention, a gate connected to receive the operating indication signals of all of the primary phase-staggered modules detects when any one has failed. The output of that gate is applied to means for enabling the spare converter module to operate. To prevent operation of the spare converter module during initial startup upon activating the source of power, the enabling means is required to receive a further signal derived from the source of power, upon its being activated, through delay means which inhibits the enabling means from being enabled until the primary phase-staggered modules have had time to reach steady operation.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 2 illustrates the manner in which phase timing signals are derived from a square waveform.

FIG. 3 is a schematic diagram of a pulse-width modulator used in the system of FIG. 1.

FIG. 4 is a waveform diagram useful in understanding the modulator of FIG. 3.

DESCRIPTION OF PREFERRED EMBODIMENTS

Figure 1:
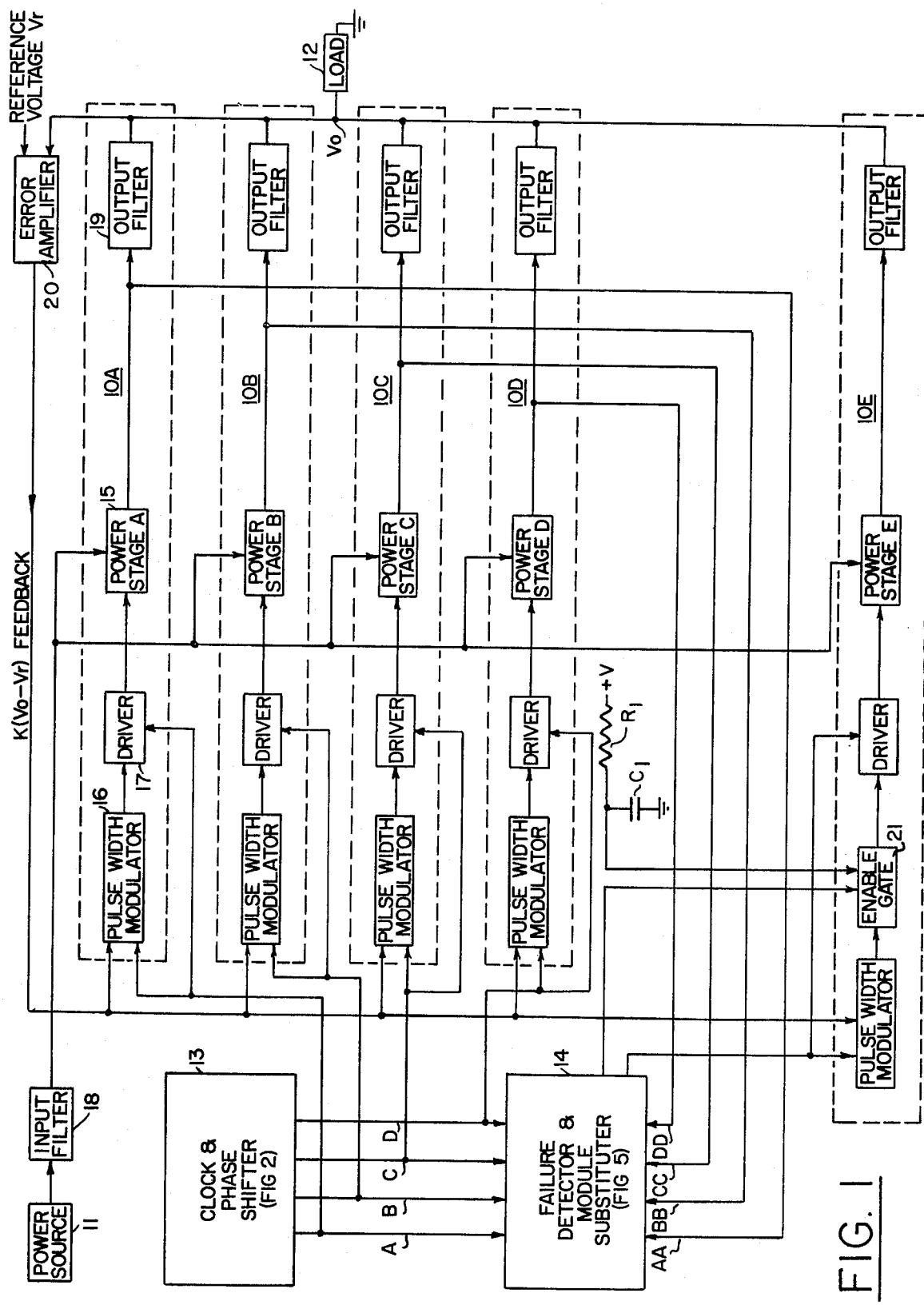
FIG. 1 is a block diagram of a system for detecting the failure of one of a plurality of phase-staggered converters and substituting a spare converter in the phase position of the failed module.

Referring to FIG. 1, an exemplary arrangement of four phase-staggered power converters 10A through 10D is shown, with one spare (standby) power converter 10E, for delivering regulated voltage from an unregulated power source 11 to a common load 12. A clock and phase shifter 13, to be described with reference to FIG. 2, controls the converters in staggered phase over lines A through D.

A failure detector and module substituter 14, to be described with reference to FIG. 4, detects the failure of any one converter over lines AA through DD and substitutes the spare converter 10E for the failed converter in phase with the operation of the failed unit as determined by its phase control signal in the corresponding one of the control lines A through B.

Each converter such as the converter 10A is comprised of a power stage 15 controlled by a pulse width modulator 16 through a driver 17. A single input filter 18 delivers unregulated power to the power stages in parallel. Each power stage is connected to the load through its own output filter 19. The voltage, $V_o$, delivered to the load is compared to a reference voltage, $V_r$, by an error amplifier 20 which transmits a feedback signal, $K(V_0-V_r)$ to the pulse width modulators. The constant K is determined by the gain of the error amplifier. This feedback controls the pulse width modulator to regulate the output voltage, $V_o$, substantially equal to the reference voltage, $V_r$, in a manner to be described with reference to FIG. 3. The spare converter 21 differs from the other converters only in that it includes a gate 21 controlled by the failure detector and module substituter 14 to enable its pulse/modulator to control its power stage through its driver when it is substituted.

Referring now to FIG. 2, the clock and phase shifter 13 is comprised of a squarewave generator 22, a 4-bit synchronous binary counter 23 and a 4-bit shift register 24. The squarewave generator drives the counter to provide a divide-by-eight function, and the shift register is clocked by the squarewave generator to shift the squarewave output of the counter through the register. The result is a pulse out of the counter of a duration equal to four periods of the squarewave generator. Since the squarewave generator shifts this output pulse through four stages, the output lines A through D of the shift register will have phase-staggered pulses, each of a duration equal to four periods of the squarewave generator successively phase displaced by one period of the squarewave generator as shown in FIG. 2.

These four square waveforms phase-staggered by the shift register 24 permit operating the converters in a multiphase or staggered sequence. That in turn makes it possible to increase the equivalent input current ripple frequency by a factor of four while simultaneously decreasing the ripple amplitude of the current from the input filter for the power stages. It therefore makes it possible to use much smaller capacitors in the power input filter. It also presents a problem in sensing the failure of one converter and substituting the spare since failure is unpredictably random. The problem is insertion of the spare in proper phase sequence without disturbing the multiphase arrangement.

Each of the normally active power converters 10A through 10D has a pulsewidth modulator of the configuration shown in FIG. 3. A resistor 30 and capacitor 31 connected to the inverting input terminal of a saturating differential amplifier 32 integrates the periodic input pulse from the clock and phase shifter just described with reference to FIG. 2 to provide a triangular waveform signal as shown in FIG. 4. A resistor 33 couples the feedback signal from the error amplifier 20 (FIG. 1) into the noninverting input terminal of the amplifier 32. As the error increases, the duty cycle of the output signal $A_m$ from the pulse width modulator thus increases to increase the power delivered to the load. Conversely, as the error decreases, the power delivered to the load decreases. This feedback control is active in each of the phase-staggered power converters. Since the duty period of any power stage equals the interval between phase-staggered output pulses from the corresponding pulse width modulator, the result is an overlapping operation of the power stages. The ripple of each converter is filtered by the output filter 19 for a smoother DC output to the load.

Figure 5:
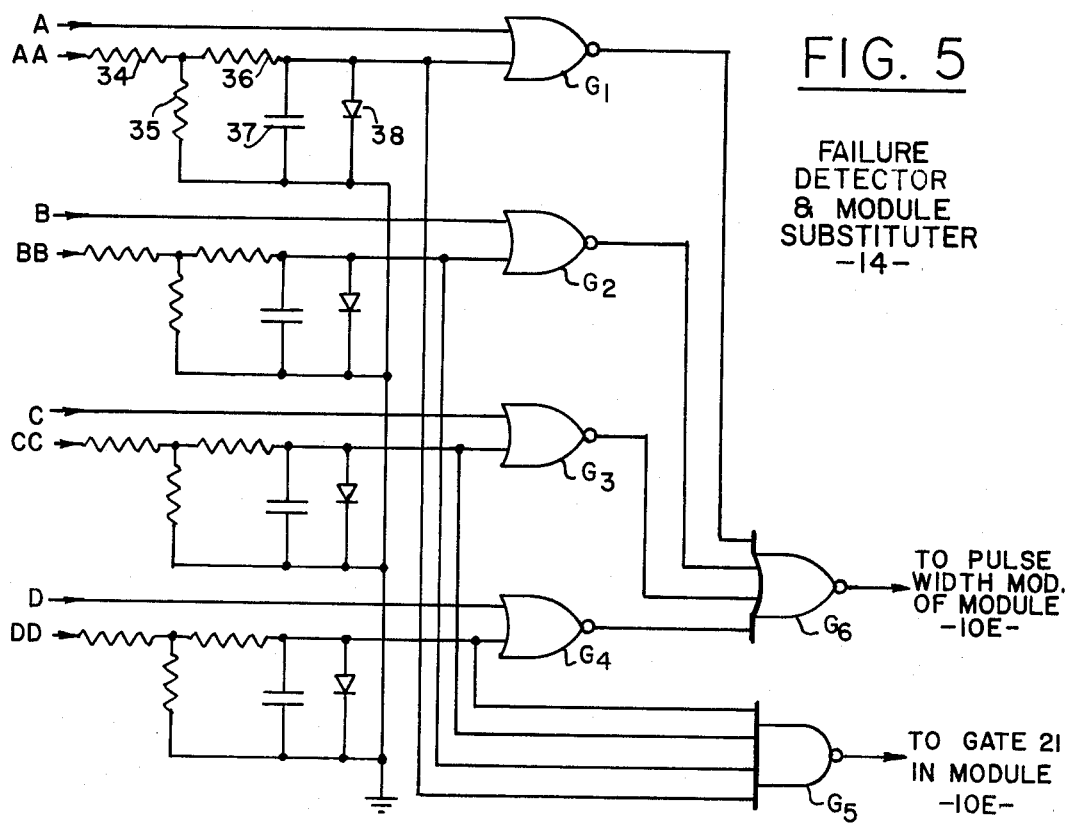
FIG. 5 is a schematic diagram of a failure detector and module substituter in the system of FIG. 1.

The outputs AA through DD of the power stages in the respective converters 10A through 10D, are connected to NOR gates $G_1$ through $G_4$, respectively, and to a NAND gate $G_5$ of the failure detector and module substituter 14 shown in FIG. 5. Consequently, when all converters are active, every input terminal of the gate $G_5$ is high, thus holding its output low. The output of that NAND gate is connected to the gate 21 of the spare converter 10E (FIG. 1) to hold it off while all of the signals AA through DD are high. At the same time, each of the NOR gates is held off since the output of a NOR gate is always low if any input is high.

Since the output of each power stage is apt to be quite high, depending upon the application, the signal fed back to the gates of the failure detector and module substituter will require some conditioning, such as through a voltage dividing network, filter and limiter as shown in FIG. 5. For example, the signal AA at the output of the power stage 15 of the converter module 10A is reduced in amplitude by voltage dividing resistors 34 and 35, filtered through a resistor 36 and capacitor 37, and limited by a diode 38 (which may in practice be two or more in series, or a Zener diode, depending on the logic one level required by NOR gates). Alternatively, the signal fed back may be derived by a transformer in the power stage, such as an auxiliary winding on the power transformer. The sensed voltage of an active converter is then rectified, filtered and limited to provide the signal fed back. This alternative is preferred, but the less expensive approach of a voltage-dividing network and limiter connected directly to the output of the power stage shown in FIG. 5 would be satisfactory. Still other techniques for deriving a conditioned signal indicative of an operating converter may occur to those skilled in the art.

Should any one of the active converters fail, the operation indicative signal to the associated one of the NOR gates and the NAND gate will go low. The output of the NAND gate $G_5$ will then go high to enable the gate 21 (FIG. 1). At the same time, the associated NOR gate will have one input held low so that as the other input goes high, the output of the gate will go low. For example, if the converter 10A fails, the signal AA becomes low (logic zero level) to drive the output of the NAND gate $G_5$ high (logic one level). The signals BB, CC and DD of active converters will be at the logic one level to hold the outputs of the NOR gates B, C and D at the logic zero level. With the signal AA at the logic zero level, the signal A from the clock and phase shifter (FIG. 2) will in effect be transmitted to the output of NOR gate $G_6$. Failure of a converter will thus automatically gate a drive signal of the proper phase to the pulse width modulator of the space converter module 10E to substitute it in the phase position of the failed module.

The function of the NOR gate alone is sufficient to hold the spare converter inactive until one of the active converters fails. The NAND gate $G_5$ and the gate 21 in the spare converter 10E are included to prevent saturation of the push-pull transformer in the power stage and to hold the input to the driver of the spare converter off during the initial start-up time. When the power source 11 is first turned on, all of the feedback signals are low, thus enabling all of the NOR gates to transmit the phase-staggered drive signals to the pulse-width modulator of the spare converter and activating the spare converter during the start-up period. To avoid that, the gate 21 has one input terminal connected to an RC network comprised of a resistor $R_1$ and a capacitor $C_1$ as shown in FIG. 1. The voltage across the capacitor will initially be zero, and will increase toward $+V$ (a voltage derived from the unregulated power supply through a voltage divider, if necessary, and limited to the logic one level). The gate 21 is thus held off for a period determined by the RC time constant of the resistor $R_1$ and capacitor $C_1$. Once the capacitor $C_1$ is fully charged to the logic one level, the gate 21 is enabled to transmit the output of the pulse width modulator of the spare converter, but only when its other control input terminal connected to the gate $G_5$ (FIG. 5) is at the logic one level. In that manner, the RC network holds the gate 21 off during start-up, and the NAND gate $G_5$ holds the gate 21 off during normal operation until there has been a failure of an active converter. The spare is then automatically substituted in the phase position of whichever one of the converters failed as determined by the NOR gates $G_1$ through $G_4$. A NOR gate $G_6$ couples the output of whichever one of the NOR gates $G_1$ through $G_4$ is active to the pulse width modulator of the spare converter.

Figure 6:
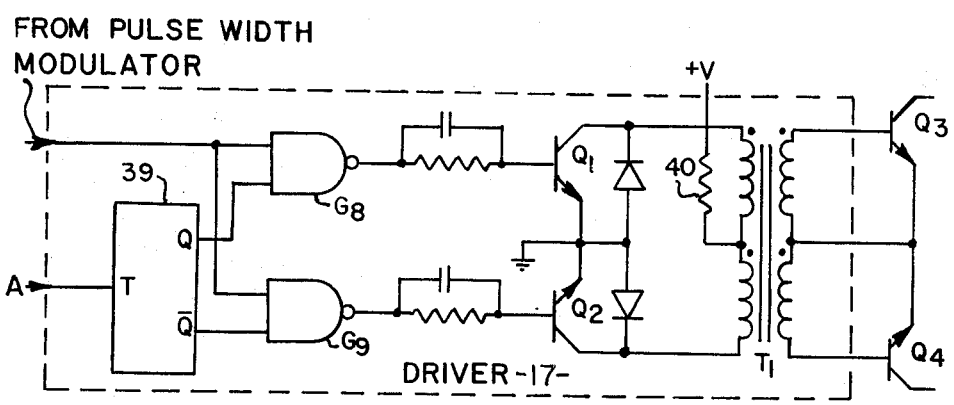
FIG. 6 is a schematic diagram of a driver in the system of FIG. 1.

A preferred embodiment of the invention employs drivers of the circuit configuration shown in FIG. 6 using two input gates $G_8$ and $G_9$ to control the cutoff intervals of transistors $Q_1$ and $Q_2$ in response to the output of the pulse width modulator, or the gate 21 in the case of the spare converter 10E. A flip-flop 39 changes state in response to every pulse (leading edge) of the phase-staggered signal A, B, C or D, depending on which converter, and in the case of the spare converter, depending upon which converter has failed.

As noted hereinbefore, the regulating feedback error signal is supplied to the non-inverting input terminal of a saturating differential amplifier (operational amplifier operating open loop as a voltage comparator for maximum gain on the order of about 100,000). Since the other input is a periodically ascending and descending voltage (triangular waveform signal) synchronized with the flip-flop 35, a voltage comparison is made at twice the rate that either of the switching transistors $Q_1$ and $Q_2$ is turned on. The triangular waveform signal rides on top of a DC level (about 5 volts) as shown in FIG. 4 and peaks at a moderately higher level (about 6.5 volts). The feedback signal K $(V_o - V_r)$ will normally be between these two levels, and the output of the comparator amplifier will be at either a high (1) or a low (0) logic level, low when the triangular waveform exceeds the feedback and high at all other times. The duty cycle (pulse width) of the comparator amplifier output thus varies inversely proportional to the amplitude of the feedback signal, i.e., inversely proportional to the output voltage $V_o$. When $V_o$ drops, the pulse width increases, and as the output voltage increases due to wider output pulses from the pulse width modulator, the pulse width decreases.

The low-level duty cycle of the pulse width modulator applied to both NAND gates $G_8$ and $G_9$ (via the gate 21 in the case of the spare converter) turns both transistors $Q_1$ and $Q_2$ on, to short out drive transformer $T_1$, regardless of the output of the flip-flop. Current through the primary winding of transformer $T_1$ is limited by resistor 40 when both transistors are on. Power is delivered to the load only for the period during which either transistor is turned off. The flip-flop 39 assures that the transistors are turned off alternately in response to pulses from the pulse width modulator. Turning off transistors $Q_1$ and $Q_2$ alternately induces pulses of alternate polarity in the secondary of the transformer $T_1$ to turn transistors $Q_3$ and $Q_4$ on alternately, thus coupling power from the source to the load through the power stage. It can thus be seen that control of power to the load is effected in the primary of transformer $T_1$. Since this transformer is common to all drivers for basic switching converters or regulators, it is apparent that the present invention is readily adaptable to all power modulation schemes such as with a booster regulator, buck boost regulator or buck regulator.

Although particular embodiments of the invention have been illustrated and described, it is recognized that modifications and variations may readily occur to those skilled in the art, and that the basic concept of the invention may be practiced in still other forms. Consequently, it is intended that the claims be interpreted to cover such modifications and variations.

What is claimed is:

1. In a system for delivering power to a load from a source through a plurality of active converter modules connected in parallel and controlled to operate in staggered phase by separate phase control signals applied to respective active converter modules, apparatus for detecting the failure of any one of said converter modules and for substituting a parallel-connected spare converter module in the phase position of the failed module, comprising means for separately sensing the power output of each of said active phase staggered converter modules to produce separate signals indicative of the respective active modules operating to deliver power to said load, and a plurality of gating means, one for each active converter module, for coupling said separate phase control signals to said space converter module, each gating means associated with a separate active converter module being disabled by the operating indication signal of the associated module to transmit the phase control signal of the associated module, whereby failure of an active converter module enables its phase control signal to be applied to said spare converter module.

2. A system as defined in claim 1 including apparatus for disabling said spare converter module from operating while all of said active converter modules are operating comprising means responsive to at least one signal condition for disabling said spare converter module, and means for detecting the coincident presence of all of said operation indication signals of said active converter modules, and for producing said one signal condition in response to the presence of all of said operation indication signals, whereby said disabling means holds said spare converter module inoperative until one of said operation indication signals fails to be present to produce said one signal condition.

3. A system as defined in claim 2 wherein said disabling means is responsive to a second signal condition for disabling said spare converter module even in the presence of one of said operation indication signals, said disabling apparatus including means for producing said second signal condition for a predetermined period following activation of said source of power sufficient to allow all of said active phase-staggered converter modules to reach steady operation.

4. In a power supply system having a plurality of converter modules connected in parallel between a source of unregulated power and a load with regulating feedback to each converter module to maintain the output voltage of the paralleled converters substantially constant, said converter modules being operated in a phase-staggered mode by phase control signals from a source, one phase control signal for each converter module, the combination comprising a spare converter module connected in parallel with said plurality of converter modules between said power source and said load, and connected to receive all of said phase control signals, said spare converter including means for enabling its operation in response to an enabling signal, said means comprising separate means for producing a signal indicative of the operation of each converter module in delivering power to said load, means for detecting the failure of any one of said operation indication signals, and for producing said enabling signal when a failure is thus detected, and a plurality of gating means, one for each of said converter modules, each gating means being connected to both the phase control signal of a different converter module and the operation indication signal of the different converter module for inhibiting the transmission of the phase control signal to the spare converter module in the presence of an operation indication signal, whereby, upon failure of any one of said converter modules, said spare module is enabled to operate under control of the phase control signal of the failed converter module.

5. In a system for detecting the failure of any one of a plurality of converter modules connected in parallel, between a power source and a load, and for activating a spare converter module in place of the failed one, where the active converter modules are controlled to operate in staggered phase-by-phase control signals, and said space converter module is connected in parallel with said plurality of active converter modules, but is inactive for lack of a phase control signal applied thereto, the combination comprising separate means for producing a feedback signal from power delivered to said load by each of said active converter modules while operating to convert power from said source to said load, a plurality of two-input gates, one for each active converter module, each of said gates having one input terminal connected to receive a different one of said phase control signals used for operation control of one of said active converter modules and its output terminal coupled to said spare converter module in order to apply a particular phase control signal thereto when the second input terminal thereof is not energized by a feedback signal from an associated active converter module controlled by the particular phase control signal, whereby said spare converter module is activated by application of any one of said phase control signals through one of said two-input gates when not energized at its second input terminal by a feedback signal due to failure of one of said active converter modules.

6. The combination of claim 5 including means within said spare converter module for inhibiting its operation in response to an inhibit signal applied thereto, and coincidence means for generating said inhibit signal in response to coincidence of said feedback signals from all of said active converter modules, whereby operation of said spare converter module is inhibited until one of said active converter modules fails.

7. The combination of claim 6 wherein said inhibiting means is further responsive to an initial delay signal, said combination including means for generating said initial delay signal for a predetermined period upon initially activating said converter modules by turning said power source on, thereby locking out said spare converter module while said active converter modules begin to deliver power to said load sufficiently to generate said feedback signals.

8. The combination of claim 7 wherein said inhibiting means is comprised of a gate enabled when two control terminals are energized by signals, and said coincidence means is comprised of a NAND gate, one control terminal of said enable gate being connected to the output terminal of said NAND gate and another control terminal of said enable gate being connected to said initial delay signal generating means, and wherein said initial delay signal generating means is comprised of a capacitor charged by said power source through a resistance path, whereby coincidence of feedback signals from all active converter modules must not be present and said initial delay signal must be present in order for said gate to be enabled.

9. The combination of claim 5 wherein each of said two-input gates in a NOR gate, and the output terminal of each NOR gate is coupled to said spare converter module by a common NOR gate.

10. The combination of claim 9 including means within said spare converter module for inhibiting its operation in response to an inhibit signal applied thereto, and coincidence means for generating said inhibit signal in response to coincidence of said feedback signals from all of said active converter modules, whereby operation of said spare converter module is inhibited until one of said active converter modules fails.

11. The combination of claim 10 wherein said inhibiting means is further responsive to an initial delay signal, said combination including means for generating said initial delay signal for a predetermined period upon initially activating said active converter modules by turning said power source on, thereby locking out said spare converter module while said active converter modules begin to deliver power to said load sufficiently to generate said feedback signals.

* * * * *

UNITED STATES PATENT AND TRADEMARK OFFICE
CERTIFICATE OF CORRECTION

PATENT NO. : 4,039,925

DATED : August 2, 1977

INVENTOR(S) : Colonel W. T. McLyman and Gene W. Wester

It is certified that error appears in the above-identified patent and that said Letters Patent are hereby corrected as shown below:

Inventor's name, "W. T. McLyman" should read "Colonel W. T. McLyman"

Signed and Sealed this

Seventh Day of February 1978

[SEAL]

Attest:

RUTH C. MASON
*Attesting Officer*

LUTRELLE F. PARKER
*Acting Commissioner of Patents and Trademarks*